United States Patent Office 3,202,570
Patented Aug. 24, 1965

3,202,570
METHOD OF FORMING A FIBERBOARD CONTAINING A FIRE-RETARDANT HYDRATED BORATE AND PRODUCT THEREOF
Otis R. Videen, Cloquet, Minn., assignor to Wood Conversion Company, St. Paul, Minn., a corporation of Delaware
No Drawing. Filed June 12, 1961, Ser. No. 116,301
12 Claims. (Cl. 162—159)

The present invention relates to the manufacture of fire-retardant panel material containing combustible vegetable fiber, such as the fiberboard useful in walls and ceilings, and in particular, to fiberboard having sound-absorbing porosity.

Heretofore, it has been a practice to render such panel material fire-retardant at the exposed surface by the use of special coatings or treatments of the surface layers of the panel. With the advent of punching or drilling such board material for acoustical uses, the surface treatments are insufficient for adequate fire-retardancy.

Such panel board is commonly made by dewatering an aqueous slurry of fibers. To incorporate fire-retardant additive well distributed throughout panel material so formed, it must be present in the slurry and it must resist to a high degree a tendency to be carried away from the fibers by the water being removed from the fibers. To this end, it must be relatively insoluble in the slurry before and during the dewatering, and it must have a particle-size-distribution and surface properties favoring its retention.

According to the present invention, certain hydrated borate compositions having the desired properties for adequate retention in so forming a wet mat to be dried have been found to impart fire-retardancy when distributed within a fiberboard, and as a group they have an adequate content of water of constitution retainable in drying the wet mat, but releasable when the dried board is exposed to the heat of a flame.

Among the available hydrated borate compounds suitable for the present invenion, there are some which occur at natural minerals, and hence, which are low in cost, compared to synthetic hydrated borate compounds. As natural minerals, they occur in association with other minerals, the presence of which with the desired borate is not detrimental to the objective.

Although the invention is not limited to acoustical panel material, the incorporation of the fire-retardant throughout the board is primarily to permit drilling or punching sound-receiving holes into the board. In non-acoustical board, surface treatment may be adequate for fire-retardancy, but when the interior is exposed by acoustic holes, the body within the surface must be rendered fire-retardant.

The borates involved are so poorly soluble in water that in a process incorporating them into a fiber slurry to form a wet mat for drying to a board, the time and temperature of subjection to water are ineffective to dissolve any appreciable portion of the borate present. However, the process, as herein described, of dewatering the slurry on a screen, as in a Fourdrinier machine, removes much more of the borate particles than is lost by dissolution.

The drying of the wet mat to a board in ovens heated to temperatures above the atmospheric boiling point of water, i.e., 212° F. or thereabouts, has the potential of releasing water of constitution from such hydrated compositions. The borates of the present invention are resistant to loss of hydrated water of constitution in such oven-drying, to the extent that the dried board retains hydrated borates with water releasable at more elevated temperatures, such as from a conflagration, whereby such release gives a fire-retardant property of the present invention.

Among the borates hereinafter described is the preferred one known as Gerstley borate, a natural mineral. Its resistance to loss of water of constitution is representative of the properties of other borates, hereinafter described.

A specimen of Gerstley borate was heated for successive periods of time at increasing temperatures, with loss of weight determined for each period. As tabulated later, the mineral may have from 15% to 28% water and organics.

| Period | Temperature, °F. | Time, hours | Equilibrium loss, percent |
|---|---|---|---|
| No. 1 | 210 | 24 | 6.4 |
| No. 2 | 275 | 90 | 5.4 |
| No. 3 | 325 | 13 | 5.6 |
| Total | | | 17.4 |

The loss in period No. 1 is no doubt free moisture of the natural mineral. In drying to form board, the temperature and exposure time are never so great as encountered in period No. 2, and the time is never so great as in period No. 1, although the entire mat reaches a temperature of at least 210° F., with the surface layers only attaining a higher temperature.

The kind of vegetable fiber, the density of the board, the content of borate, the kind of borate, and the standard of fire-retardancy, are all factors controlling that content of a particular borate which just meets a standard test. Consequently, it is not possible to prescribe a range of content or proportion of borate to fiber. The amount to be retained in a board is to be determined by empirical testing. However, the amount to be used in the slurry is greater than the amount to be retained in the board.

The borates to be useful must be well distributed as fine particles throughout the board, and in consequence, fine particles are added to the slurry of fibers. To avoid excessive loss of the fine particles in dewatering the slurry, a flocculating agent is added to deposit the particles on the fibers. This is explained more in detail in Example 1.

In the field of commercial fiberboards, there are various standards for fire-retardancy, varying upwardly in severity of the test conditions. In particular, the requirements for decorative wood-fiber ceiling tile are severe, in order that tile exposed at one location to fire does not rapidly carry the fire to other locations. Such decorative tile commonly has a covering layer of coating material. Heretofore, this coating material has been of fire-retardant character, and at best, has been an intumescent fire-retardant coating. Ordinary combustible woodfiber tile having such fire-retardant coat can easily meet certain standards.

But, with the advent of acoustic tile wherein holes are punched or drilled into the tile, the holes render such a retardant-coated tile less fire-retardant and to such degree that some standards are not met. The present invention introduces a fire-retardant additive into the body of a board, so that when sound-receiving holes are formed into an acoustically porous board having a covering coat, the acoustic board can meet a desired standard even without a fire-retardant coat, thus permitting the use of non-combustible decorative coatings which are not compounded for fire-retardancy.

The preferred board of the present invention is one having a combustible felted fiber content, a fire-retardant content of hydrated borate composition, and on one face thereof, a fire-retardant coat, which may be intumescent. However, the invention is not limited to a coated board.

Gerstley borate is a natural borate salt. There are other natural mineral borates having a suitably high content of water of constitution for use as a fire-retardant, two of these being known as colemanite and ulexite.

The natural borates are preferred for economic reasons. They need not be chemically pure and may be used in association with minor quantites of naturally associated minerals of different composition. The natural ones predominate in borate-forms of CaO, but not to the exclusion of other metal oxides as illustrated by ulexite having the formula $NaCaB_5O_9 \cdot 8H_2O$ or $$Na_2O \cdot 2CaO \cdot 5B_2O_3 \cdot 16H_2O$$

The following table shows known forms as identified in the literature and described as poorly soluble, some being natural and some synthetic:

| | Name | Composition | Moles of $H_2O$ per 30 moles $B_2O_3$ |
|---|---|---|---|
| A | Monoborates | $CaO.B_2O_3.6H_2O$ | 180 |
| | | $CaO.B_2O_3.4H_2O$ | 120 |
| | | $CaO.B_2O_3.2H_2O$ | 60 |
| B | Tetraborate | $CaO.2B_2O_3.5H_2O$ | 75 |
| | | $CaO.2B_2O_3.12H_2O$ | 180 |
| C | Triborates | $CaO.3B_2O_3.8H_2O$ | 80 |
| | | $CaO.3B_2O_3.4H_2O$ | 40 |
| D | Colemanite Series | $2CaO.3B_2O_3.9H_2O$ | 90 |
| | | $2CaO.3B_2O_3.7H_2O$ | 70 |
| | | $2CaO.3B_2O_3.5H_2O$ | [1] 50 |
| E | Pentaborate | $3CaO.5B_2O_3.9H_2O$ | 54 |
| F | Decaborate | $4CaO.5B_2O_3.9H_2O$ | [2] 54 |

[1] (Colemanite).
[2] (Pandermite).

The naturally occurring Gerstley borate is preferred. It is a mixture of the colemanite which has $5H_2O$ of the table above, and of ulexite. Two typical analytical compositions of borates are as follows:

| | Colemanite, percent | Gerstley borate, percent |
|---|---|---|
| $B_2O_3$ | 32.6 | 33.0 |
| CaO | 33.8 | 15.9 |
| $Na_2O$ | .5 | 4.9 |
| Water and organics | 15.2 | 28.2 |
| $SiO_2$ | 3.0 | 9.5 |
| MgO | 1.2 | 3.5 |
| $Al_2O_3$ | .9 | 1.1 |
| $Fe_2O_3$ | .2 | .3 |
| $CO_2$ | 12.4 | 3.2 |
| Undetermined | .2 | 0.4 |
| Solubility in water as percent $B_2O_3$: | | |
| 15 Minutes Agitation: | | |
| 60° F | | 0.04 |
| 70° F | 0.06 | |
| 82° F | 0.12 | |
| 180° F | | 0.4 |

The compositions above tabulated are comprehended by the following general formula:

$$aMO \cdot bB_2O_3 \cdot cH_2O$$

wherein $a = 10$ to $30$,
$b = 30$,
$c = 40$ to $180$, and
MO is selected from the group consisting of CaO, and, when $a = 18$, $Na_2O \cdot 2CaO$ (as in ulexite).

*Example 1*

A slurry is formed containing the following materials:

| | Parts by weight |
|---|---|
| Board-forming wood fibers | 100 |
| Gerstley borate | 23 |
| Polyacrylamide flocculating agent | 0.02 |
| Ferric sulfate flocculating agent | 1.0 |
| Water | 4450 |

The retention is slightly better using the flocculating agent than without it, so its use is optional. The borate mineral is added after dispersing the fibers, and then the flocculating agents are added either together, or first adding the ferric sulfate and then the polyacrylamide. The ferric sulfate may be replaced by other coagulants, soluble polyvalent metal compounds or salts being suitable, such as alum, calcium chloride, lime, and insoluble ones, such as bentonite. However, these are not 100% efficient in flocculating the mineral particles onto the fibers, so that a more efficient flocculating agent is used, such as polyacrylamide. The latter may be used as the sole flocculating agent, but being more costly than the inorganic ones, it is used to flocculate at least some of the particles which are not deposited by the inorganic flocculating agent.

The slurry is dewatered on a Fourdrinier machine to a mat which when dried yields a porous fiberboard of 17 to 20 pounds per cu. ft., and of conventional wallboard thickness, such as one-half inch, in which approximately 87.5% or more of the borate is retained.

For uses of the board which are not decorative, the dried board is fire-retardant to a useful degree.

For decorative uses, the board may be coated with a decorative coat, such as Composition A, given below. This may be applied to the wet mat before drying or to the dried board. When a highly fire-retardant coat is desired, intumescent Composition B is employed. For economic and other reasons, it is preferred to apply to the wet mat Composition A in the amount of 20 to 25 pounds per M sq. ft., and then to apply to the dried coated face Composition B in the amount of 10 to 20 pounds per M sq. ft.

For acoustic purposes, the coated board may be drilled or punched to form acoustic holes. The holes preferably approach but do not meet the opposite face, not only for acoustical purposes, but also to avoid channelling hot gases of a flame through the board where it may be unbacked.

*Composition A*

| | Parts by weight |
|---|---|
| Vegetable protein binder | 6 |
| Pigments: | |
| Titanium calcium pigment (30% $TiO_2$–70% $CaSO_4$) | 36 |
| Clay | 33 |
| Diatomaceous earth | 5 |
| Whiting | 5 |
| Lithopone | 15 |

*Composition B*

| | Parts by weight |
|---|---|
| Vinylidene chloride copolymer | 15 |
| Mono-ammonium phosphate | 45 |
| Pentaerythritol | 16 |
| Dicyandiamide | 11 |
| Titanium dioxide | 13 |

The effect of the borate in an uncoated board is evident from the following comparative tests. A conventional aqueous slurry of wood fiber for forming a board has been used at a fiber concentration of 1.75 to 2.25 parts per 100 of slurry. Particles of the borate mineral are incorporated at recorded proportions relative to fiber. The slurry is dewatered by a standardized procedure comparable to the action of a Fourdrinier machine, to a wet mat and dried to a board of about 17 pounds per cu. ft., and about ½ inch thick. Test strips 1 x 8 inches are then cut.

The bottom end of the 1 x 8 inch strip suspended vertically is ignited with a Tirrill gas burner. The burner flame is adjusted to a height of four inches above the tip. The tip is then placed exactly three inches below the sample strip for a 30-second flame exposure on the sample. The burner is then removed and the duration of flaming recorded. The loss of weight by combustion is determined and the length of char height measured. The percent of the added borate mineral retained in forming the board is also determined. The following table gives these results:

| Additive | Am't. per 100 fiber | Amount retained | Percent loss by burning | Duration of flame in seconds | Length of char |
|---|---|---|---|---|---|
| Ulexite (100-200 mesh) | 10 | 5.2 | 31.8 | 90+ | 6.2 |
| | 20 | 12.4 | 21.1 | 90+ | 3.5 |
| | 30 | 17.4 | 17.7 | 50 | 2.4 |
| | 40 | 24.3 | 13.1 | 20 | 1.5 |
| (No flocculating agent) | 50 | 32.6 | 10.5 | 14 | 1 |
| | 100 | 55 | 9.5 | 5 | 1.4 |
| Gerstley borate (100-200 mesh) | [1] 25 | 18.1 | 20.6 | 90+ | 3.5 |
| | [2] 25 | 18.1 | 18.9 | 90+ | 3.5 |

[1] No flocculating agent.
[2] With flocculating agent.

It is to be understood that the invention is not limited to using only one kind of the borates but that they may be mixed.

The invention is not limited to and by the illustrative examples which represent the presently preferred embodiments of the invention. Modifications are contemplated as falling within the scope of the invention as expressed in the appended claims.

I claim:

1. A fiberboard comprising essentially a combustible fiber content and a fire-retardant particulate content of hydrated borate salt having the general formula $$aMO \cdot bB_2O_3 \cdot cH_2O$$

wherein MO includes from 10 to 30 moles of CaO per 30 moles of $B_2O_3$ and wherein there are from 40 to at least 180 moles of $H_2O$ per 30 moles of $B_2O_3$.

2. A fiberboard according to claim 1 in which MO consists of 6 moles of $Na_2O$ and 12 moles of CaO.

3. A fiberboard comprising essentially a combustible fiber content and a fire-retardant particular content of hydrated borate salt of the general formula $$aMO \cdot bB_2O_3 \cdot cH_2O$$

wherein
$a=10$ to 30,
$b=30$,
$c=40$ to 180, and
MO is selected from the group consisting of CaO and the combination $1Na_2O \cdot 2CaO$ when $a=18$.

4. A fiberboard comprising essentially a combustible fiber content and a fire-retardant particulate content of naturally occurring mineral having as the essential and predominant content hydrated borate salt of composition within the general formula $$aMO \cdot bB_2O_3 \cdot cH_2O$$

wherein
$a=10$ to 30,
$b=30$,
$c=40$ to 180, and
MO is selected from the group consisting of CaO and the combination $1Na_2O \cdot 2CaO$ when $a=18$.

5. A fiberboard comprising essentially a combustible fiber content and a fire-retardant particulate content of naturally occurring mineral selected from the group consisting of colemanite, ulexite, Gerstley borate.

6. A fiberboard according to claim 3 having acoustical porosity, said fiberboard having sound-receiving openings from one face thereof into the interior whereby the walls of said openings are rendered fire-retardant by the content of said borate salt.

7. A fiberboard according to claim 5 having acoustical porosity, said fiberboard having sound-reeciving openings from one face thereof into the interior whereby the walls of said openings are rendered fire-retardant by the content of said mineral.

8. In a method of forming a rigid porous fire-retardant board comprising forming a slurry of combustible vegetable fibers and an excess of a retainable fire-retardant quantity relative to said fibers of finely divided particles of a composition of boron oxide, dewatering said slurry to form a mat, and drying said mat to a rigid porous board, the improvements wherein a flocculating agent is present for attaching said particles to the fibers, and wherein said composition is a hydrated borate of the general formula $$aMO \cdot bB_2O_3 \cdot cH_2O$$

wherein
$a=10$ to 30,
$b=30$,
$c=40$ to 180, and
MO is selected from the group consisting of CaO and the combination $1Na_2O \cdot 2CaO$ when $a=18$.

9. In a method of forming a rigid porous fire-retardant board comprising forming a slurry of combustible vegetable fibers and an excess of a retainable fire-retardant quantity relative to said fibers of finely divided particles of a composition of boron oxide, dewatering said slurry to form a mat, and drying said mat to a rigid porous board, the improvement wherein said composition is naturally occurring mineral selected from the group consisting of colemanite, ulexite and Gerstley borate.

10. In a method of forming a rigid porous fire-retardant board comprising forming a slurry of combustible vegetable fibers and an excess of a retainable fire-retardant quantity relative to said fibers of finely divided particles of a composition of boron oxide, dewatering said slurry to form a mat, and drying said mat to a rigid porous board, the improvements wherein a flocculating agent is present for attaching said particles to the fibers and wherein said composition is naturally occurring mineral selected from the group consisting of colemanite, ulexite and Gerstley borate.

11. In a method of forming a rigid porous fire-retardant board comprising forming a slurry of combustible vegetable fibers and an excess of a retainable fire-retardant quantity relative to said fibers of finely divided particles of a composition of boron oxide, dewatering said slurry to form a mat, and drying said mat to a rigid porous board, the improvement wherein said composition is substantially insoluble in water during the formation of the slurry and the dewatering and drying thereof, and contains hydrating water of constitution resistant to loss during said drying of the mat.

12. In a method of forming a rigid porous fire-retardant board comprising forming a slurry of combustible vegetable fibers and a fire-retardant quantity relative to said fibers of finely divided particles of a composition of boron oxide, dewatering said slurry to form a mat, and drying said mat to a rigid porous board, the improvement wherein said composition is a naturally occurring mineral selected from the group consisting of colemanite, ulexite and Gerstley borate.

(References on following page)

References Cited by the Examiner

UNITED STATES PATENTS

| | | | |
|---|---|---|---|
| 1,778,147 | 10/30 | Edwards | 162—159 |
| 1,860,134 | 5/32 | Brown | 162—159 |
| 1,937,679 | 12/33 | Wiener et al. | 162—159 |
| 2,849,316 | 8/58 | Lauring | 162—159 |
| 2,858,895 | 11/58 | Connell | 169—1 |
| 2,875,044 | 2/59 | Dunn et al. | 162—181 |
| 3,013,937 | 12/61 | Brown et al. | 162—117 |

FOREIGN PATENTS

| | | |
|---|---|---|
| 148,862 | 11/52 | Australia. |
| 549,782 | 12/57 | Canada. |

DONALL H. SYLVESTER, *Primary Examiner.*

RICHARD D. NEVIUS, MORRIS O. WOLK,
*Examiners.*

UNITED STATES PATENT OFFICE
CERTIFICATE OF CORRECTION

Patent No. 3,202,570                                       August 24, 1965

Otis R. Videen

It is hereby certified that error appears in the above numbered patent requiring correction and that the said Letters Patent should read as corrected below.

Column 1, line 43, for "at" read -- as --; column 5, line 38, for "particular" read -- particulate --.

Signed and sealed this 19th day of April 1966.

(SEAL)
Attest:

ERNEST W. SWIDER
Attesting Officer

EDWARD J. BRENNER
Commissioner of Patents